(12) United States Patent
Simpson

(10) Patent No.: US 9,092,799 B2
(45) Date of Patent: Jul. 28, 2015

(54) EMBEDDED SURVEY AND ANALYTICS ENGINE

(75) Inventor: Zachary B. Simpson, Austin, TX (US)

(73) Assignee: Traitwise Inc., Austin, TX (US)

( * ) Notice: Subject to any disclaimer, the term of this patent is extended or adjusted under 35 U.S.C. 154(b) by 338 days.

(21) Appl. No.: 13/341,979

(22) Filed: Dec. 31, 2011

(65) Prior Publication Data

US 2013/0173688 A1 Jul. 4, 2013

(51) Int. Cl.
*G06F 15/16* (2006.01)
*G06Q 30/02* (2012.01)

(52) U.S. Cl.
CPC ................... *G06Q 30/0203* (2013.01)

(58) Field of Classification Search
USPC .......................................... 709/203, 201, 202
See application file for complete search history.

(56) References Cited

U.S. PATENT DOCUMENTS

| 2007/0067297 | A1* | 3/2007 | Kublickis | 707/9 |
| 2010/0262463 | A1* | 10/2010 | Tryfon | 705/10 |
| 2013/0132156 | A1* | 5/2013 | Grossman et al. | 705/7.32 |

* cited by examiner

*Primary Examiner* — Lan-Dai T Truong
(74) *Attorney, Agent, or Firm* — Gregory K. Goshorn; Greg Goshorn, P.C.

(57) ABSTRACT

Provided are techniques for receiving, by an embedded survey and analytics server (ESAS), a request for a survey. Each survey item of the survey comprising one of a survey item type, the survey item types comprising information, question and bonus types; correlating the request for the survey with a particular client and a particular customer; generating a survey by selecting a first selection of survey items corresponding to the particular client and the particular customer; transmitting the survey to an embedded survey and analytics client (ESAC) on a computing device associated with the customer; embedding, by the ESAC, the survey into an electronic communication; transmitting the electronic communication to the client; receiving, at the ESAS, responses, each response corresponding to a specific survey item of the first selection of survey items; analyzing, by the ESAS, the responses to produce survey results; and transmitting the survey results to the customer.

17 Claims, 8 Drawing Sheets

EMBEDDED SURVEY AND ANALYTICS ENGINE

FIELD OF THE DISCLOSURE

The claimed subject matter relates generally to computer implemented data collection and analysis and, more specifically, to a combination of crowd-sourced data and analytics of the crowd-source data presented to a client by embedding a survey into electronic communication.

SUMMARY

Over the past several decades, computer users have employed the Internet to conduct research and gather information. Service providers, retailers and others have also employed the Internet to gather data on users. For example, many retail sites collect and analyze user information relating to inquiries and purchases to anticipate a user's spending habits and preferences. In this manner, promotional activities and suggested purchases may be personalized for individual users. Search engines may also track users' searches, both on an individual basis and collectively, to better anticipate future searches as well as for other reasons. In addition, business entitles may collect information from users in the form of surveys.

Provided are techniques for receiving, by an embedded survey and analytics server (ESAS), a request for a survey, the survey comprising a plurality of survey items, each survey item comprising one of a survey item type, the survey item types comprising intimation survey items and question survey items; correlating the request for the survey with a particular client and a particular customer; generating a survey by selecting a first selection of survey items corresponding to the particular client and the particular customer; transmitting the survey to an embedded survey and analytics client (ESAC) on a server computing device associated with the particular customer; embedding, by the ESAC, the survey into an electronic communication; transmitting the electronic communication to the client; receiving, at the ESAS, a plurality of responses, each response corresponding to a specific survey item of the first selection of survey items; analyzing, by the ESAS, the plurality of responses to produce survey results; and transmitting the survey results to the customer.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAIL DESCRIPTION OF THE FIGURES

Figure 1:
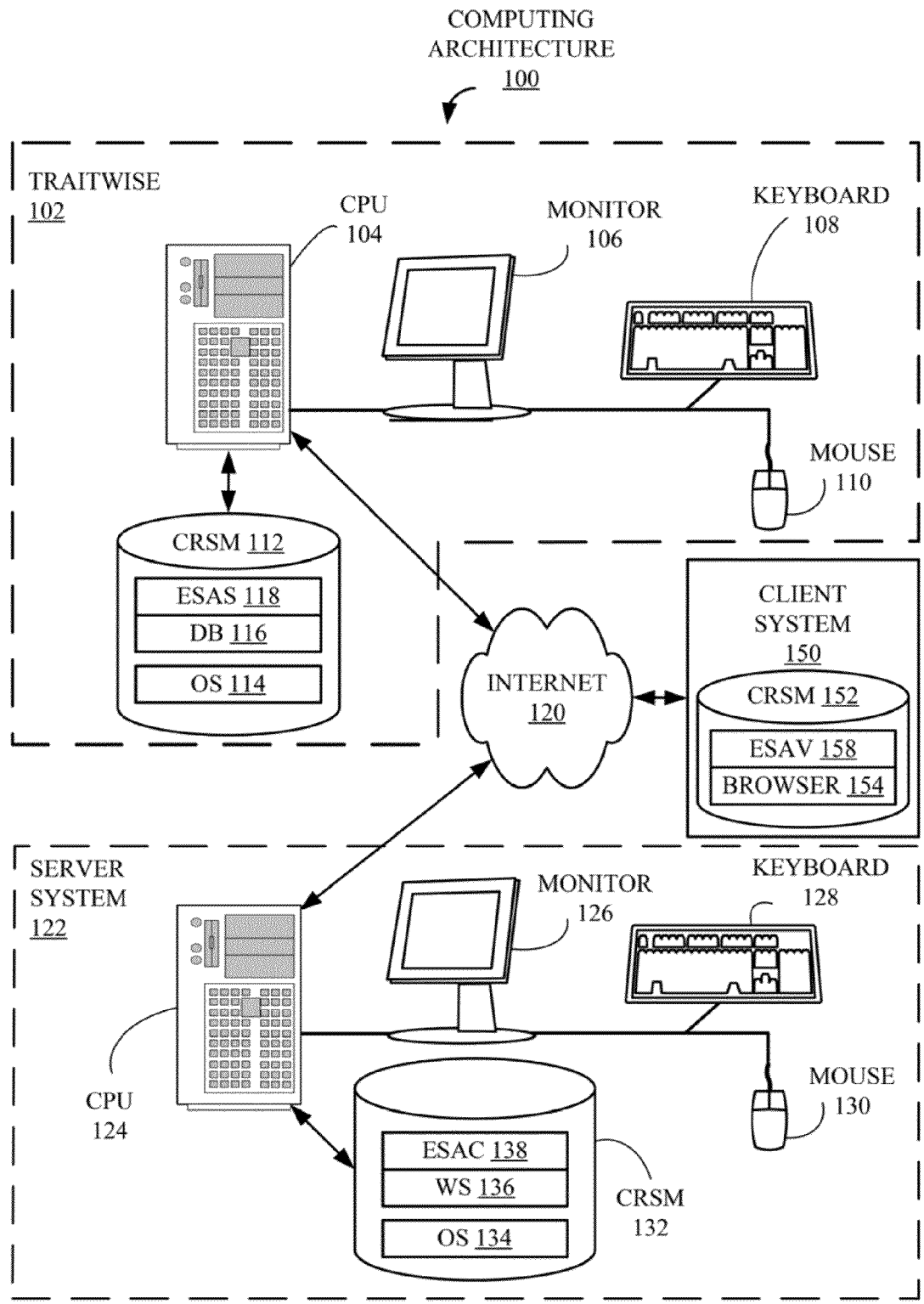
FIG. 1 is a block diagram of a computing architecture that may support the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of a computing architecture 100 that may support the claimed subject matter. Traitwise 102 includes a central processing unit (CPU) 104, coupled to a monitor 106, a keyboard 108 and a pointing device, or "mouse," 110, which together facilitate human interaction with computing system 100 and Traitwise 102. Also included in Triatwise 102 and attached to CPU 104 is a computer-readable storage medium (CRSM) component 112, which may either be incorporated into client system 102 i.e. an internal device, or attached externally to CPU 104 by means of various, commonly available connection devices such as but not limited to, a universal serial bus (USB) port (not shown).

CRSM 112 is illustrated storing an operating system (OS) 114, a database (DB) 116 and an Embedded Survey and Analytics Server (ESAS) 118. DB 116 and ESAS 118 are explained in more detail below in conjunction with FIGS. 2 and 4-8. Traitwise 102 and CPU 104 are connected to the Internet 120, which is also connected to a server system 122. Although in this example, client system 102 and server system 122 are communicatively coupled via the Internet 120, they could also be coupled through any number of communication mediums such as, but not limited to, a local area network (LAN) (not shown). Like Traitwise 102, server system 122 includes a CPU 124, a monitor 126, a keyboard 128 and a mouse 130. A CRSM 132 coupled to CPU 124 is illustrated as storing an OS 134, a web server (WS) 136 and an Embedded Survey and Analytics Client (ESAC) 138. In this example, ESAC 138 is coupled to WS 136 although ESAC 138 may also be a standalone application that interacts, with WS 136. ESAC 138 is explained in more detail below in conjunction with FIGS. 3-8.

Also illustrated in FIG. 1, is a client system 150, which may implement aspects of the disclosed technology. Although not illustrated, client system also includes a CPU, monitor, keyboard and mouse that provide human interaction with client system 150. Client system 150 is coupled to the Internet 120 which provides a path for communication between client system 150 and ESAS 118 and ESAC 1.38. Coupled to client system 150 is a CRSM 152, illustrated including a web browser, or browser, 154 and an Embedded Survey and Analysis Viewer (ESAV) 158. Client system 150, browser 154 and ESAV 158 provide a potential survey taker, or client, with an interface to ESAS 118 and ESAC 138 via an attached monitor, including the ability to suggest survey questions. It should be noted that, in the alternative, functionality of the claimed subject matter used by a client may be implemented by employing the capabilities of browser 154, without the need of any separate component such as ESAV 158. Various examples of screens that may be displayed on the attached monitor are illustrated below in conjunction with FIGS. 4 and 5. It should be noted there are many possible computing system and architecture configurations that may implement the claimed subject matter, of which Traitwise 102, server system 122, client system 150 and computing architecture 100 are only simple examples. For example, client system 150 may be a mobile computing device such as, but not limited to, a smart telephone, notebook or laptop computer. It is anticipated that the claimed technology may be implemented in conjunction with an application configured for use on such a mobile computing device.

For the sake of clarity, throughout the remainder of the Specification, users of ESAS 118 on Traitwise 102 are referred to as "administrators," users of ESAC 138 on server system 122 are referred to as "customers" and users of ESAV 158 on client system 150 are referred to simply as "clients" or "respondents." In short, Traitwise 102 hosts ESA "Server" 118, which is used by administrators; server system 122 hosts ESA "Client" 138, which is used by customers; and client system 150 hosts ESA "View" 158, which is used by clients or respondents to actually take a survey presented in accordance with the claimed subject matter.

Figure 2:
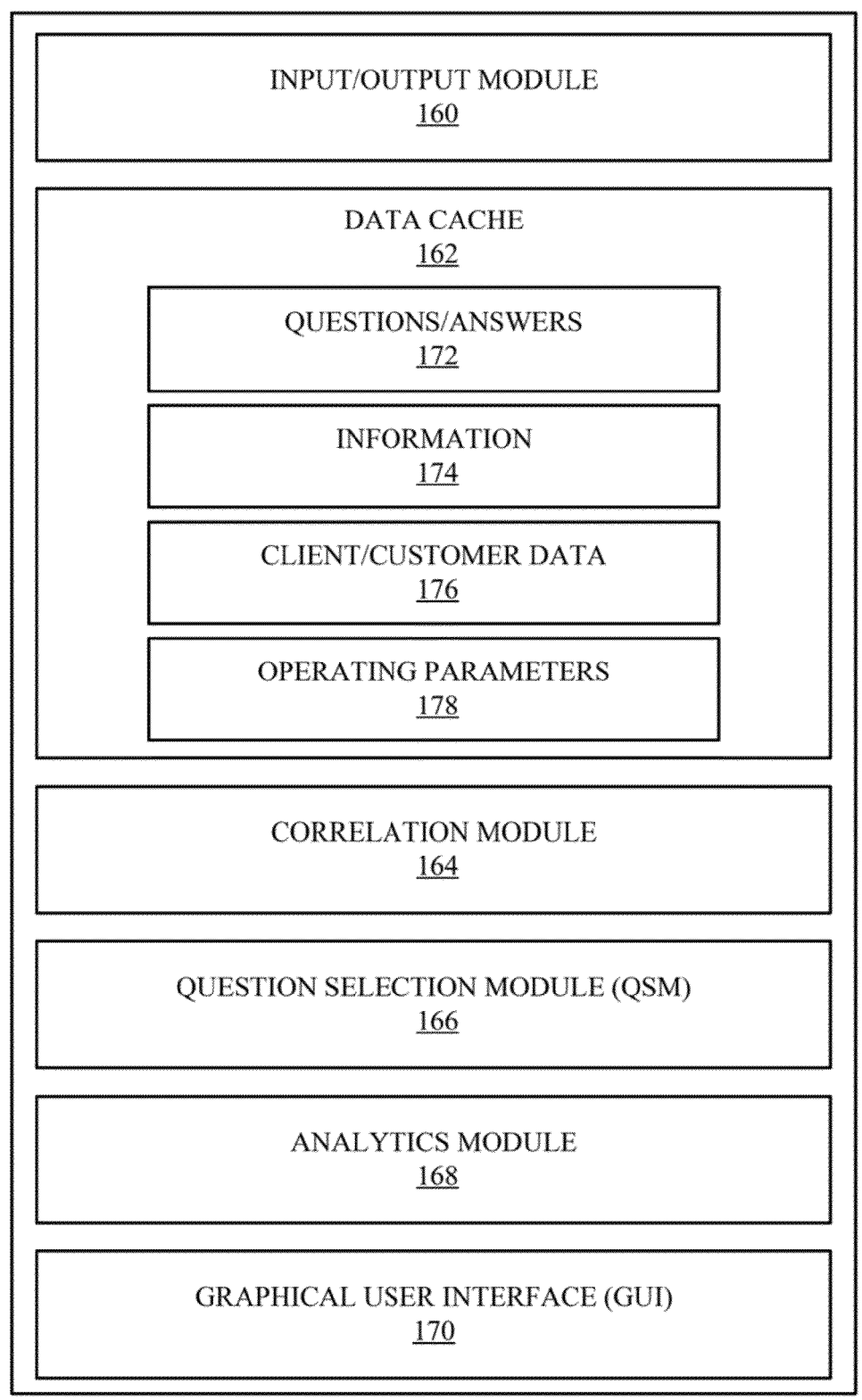
FIG. 2 is a block diagram of an Embedded Survey and Analytics Server (ESAS) that may implement aspects of the claimed subject matter.

FIG. 2 is a block diagram of ESAS 118, first introduced above in FIG. 1, in greater detail. In this example, ESAS 118 is standalone application coupled to DB 116 (FIG. 1). In an alternative embodiment DB 116 may be incorporated into ESAS 118. In addition to being stored on CRSM 112, ESAC 118 is loaded and executed on one or more processors (not shown) of CPU 104 (FIG. 1) of Traitwise 102 (FIG. 1). As explained above in conjunction with FIG. 1, users of ESAS 118 are referred to as "administrators."

ESAS 118 includes an input/output (I/O) module 160, a data cache 162, a correlation module 164, a question selection module (QSM) 166, an analytics module 168 and a graphical user interface (GUI) 170. It should be understood that the representation of ESAS 118 in FIG. 2 is a logical model. In other words, components 160, 162, 164, 166, 168 and 170 may be stored in the same or separates files and loaded and/or executed within Traitwise 102 either as a single executable or as separate processes interacting via any available inter process communication (IPC) techniques.

I/O module 160 handles any communication ESAS 118 has with other components of Traitwise 102 and architecture 100 (FIG. 1). Data cache 162 is a data repository for information, survey items, including questions, answers and related analysis, and parameters that ESAS 118 requires during normal operation. Examples of the types of data stored in data cache 162 include questions/answers 172, information 174, a client/customer data 176 and operating parameters 178. Questions/answers 172 stores a list of survey questions and corresponding answers that are presented to a user or respondent on client system 150. As explained in more detail below, questions and answers may be generated by administrators on Traitwise 102, by administrators, or clients, on server system 122 (FIG. 1) employing ESAC 138 (FIG. 1) or by users or respondents on client system 150 (FIG. 1) employing ESAV 158 (FIG. 1). In other words, particular answers to questions may be defined, in conjunction with the generation of questions, by administrators on Traitwise 102, by clients on server system 122 and by users on client system 150. In the alternative, questions/answers 172 may be combined in a "survey" data area that includes questions and corresponding answers grouped or indexed into current, previous or potential surveys.

Information 174 stores data related to questions and answers in questions/answers 172, including historical and scientific information and previous responses. In addition to data stored in information 174, ESAS 118 may be linked to public, private and customer databases and information sources to retrieve information content.

Client/customer data 176 stores information on clients that have taken or are about to take a survey and customers on different server systems that have contracted for the services provided by Traitwise 102. Operating parameters 178 stores information on administrator preferences that control the operation and look of ESAS 118 and potentially ESAC 1.38 (FIG. 1) and screens associated with ESAV 158 (FIG. 1). For example, an administrator may specify, by means of a particular parameter, a format for a display relating to a survey. An administrator may specify various criteria for question selection and the correlation of particular questions.

Correlations module 164 includes logic for ascertaining statistically significant answer correlations between pairs of questions. Algorithms associated with correlation module 164 employ statistical methods that should be familiar to those with skill in the relevant arts. Question Selection Module (QSM) 166 includes logic for the stochastic selection of questions with goals including, but not limited to: 1) maximizing coverage of a question set; 2) providing a client with questions relevant to a particular requested topic; and 3) satisfying any intra-questions requirements. With respect to No. 3, the selection of one question may be dependent upon a particular answer to a different question. For example, posing the question "the length of time I've had sleep problems," may be predicated on the "requirement" of a positive answer to the question, "Do you have sleep problems?"

Analytics module 168 analyses specific answers to questions posed to a client and provides feedback to the client, ESAS 1.38 (FIG. 1) and, potentially, Traitwise 150 (FIG. 1). In addition, analytics module 168 may, based upon specific answers, provide feedback to QSM 166 to affect the selection of questions. For example, a particular answer to a question on age may lead to the selection of more age-appropriate questions. In addition, analytics module 168 reports statistics concerning usage and question coverage to customers on server system 122. GUI component 168 provides a means for customers of ESAC 118 to interact with and to define various parameters of ESAC 118. Components 160, 162, 164, 166, 168, 170, 172 and 174 are described in more detail below in conjunction with FIGS. 4-8.

Figure 3:
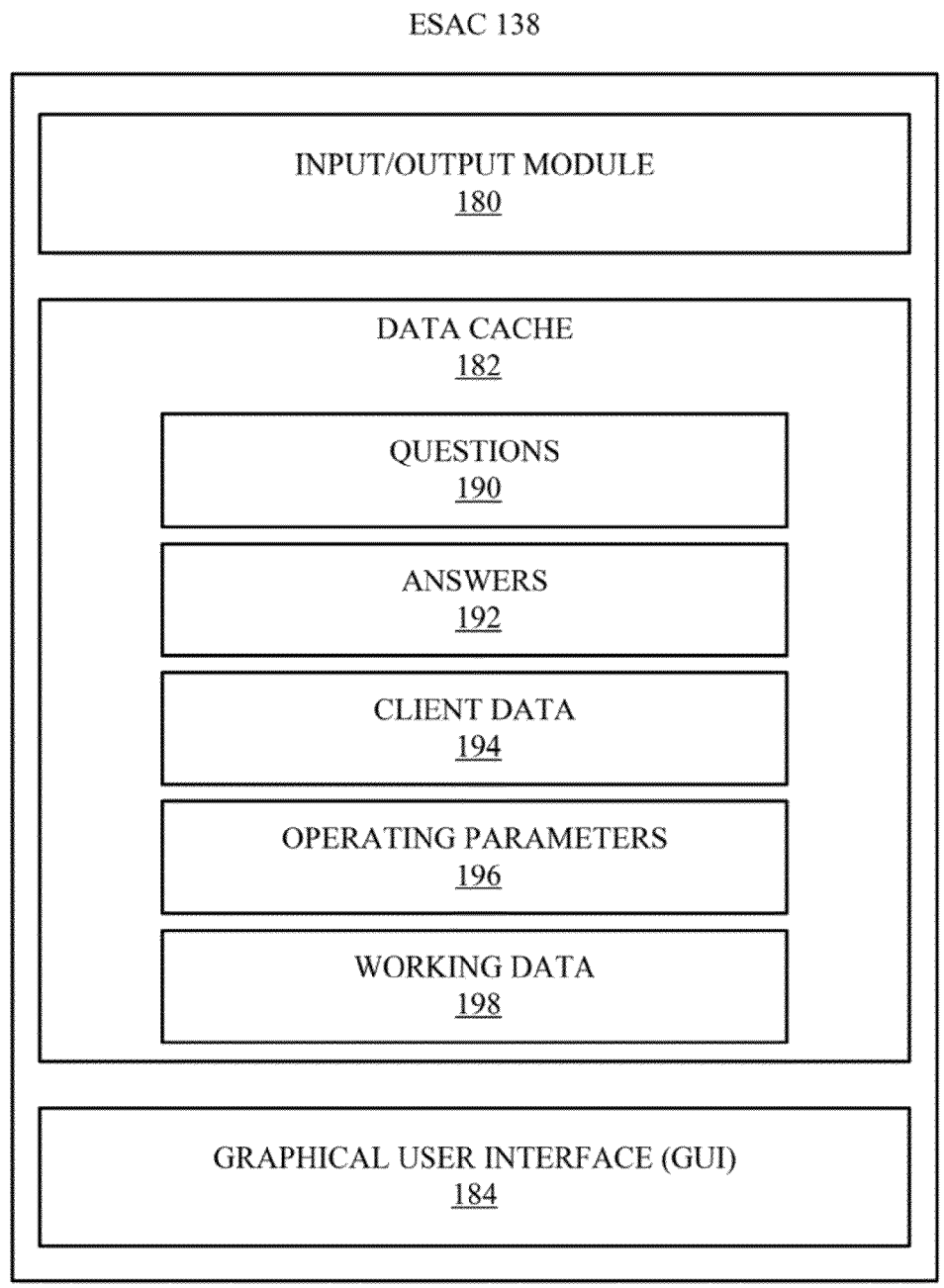
FIG. 3 is a block diagram of an Embedded Survey and Analytics Client (ESAC) that may implement aspects of the claimed subject matter.

FIG. 3 is a block diagram of ESAC 138 (FIG. 1) that may implement aspects of the claimed subject matter. In this example, ESAC 138 is implemented as a plugin module for WS 136 (FIG. 1). In addition to being stored on CRSM 132, ESAS 138 is loaded and executed on one or more processors (not shown) of CPU 124 (FIG. 1) of server system 122 (FIG. 1).

ESAC 138 includes an input/output (I/O) module 180, a data cache 182 and a graphical user interface (GUI) 184. It should be understood that the representation of ESAC 138 in FIG. 3 is a logical model. In other words, components 180, 182 and 184 may be stored in the same or separates tiles and loaded and/or executed within client system 122 either as a single executable or as separate processes interacting via any available inter process communication (IPC) techniques.

I/O module 180 handles any communication ESAC 138 has with other components of server system 122, Traitwise 102 (FIG. 1), client system 150 (FIG. 1) and architecture 100 (FIG. 1). Data cache 182 is a data repository for information, including questions and answers and parameters that ESAC 138 requires during normal operation. Examples of the types of information stored in data cache 182 include questions 190, answers 192, client data 194, operating parameters 196 and working data 198. Questions 190 stores a list of survey questions that are presented to a client using browser 154 and/or ESAV 158 (FIG. 1) on client system 150 (FIG. 1). Answers 192 stores some potential answers to questions stored in questions 190. Typically, questions 190 and answers 192 are each a subset of questions 172 (FIG. 2) and answers 174 (FIG. 2), respectively, selected based upon defined requirements of the client associated with ESAC 138. In the alternative, all questions and answers of client surveys may be provided from content associated with ESAS 118 without involvement of questions 190 and answers 192 on ESAC 138.

Client data 194 stores information about current and previous survey takers, including unique client identification keys to identify each particular client. Operating parameters 196 stores information on various customer and administrator preferences that control the operation and look of ESAC 138. For example, a customer may specify, by means of a particular parameter, a format for a display relating to a survey. Working data 198 stores the results of intermediate operations. GUI 184 provides a means for customers on ESAC 138 to interact with and to define information in questions 190, answers 192, client data 194, and operating parameters 196 of ESAC 138. Components 180, 182, 184, 190, 192, 194, 196 and 198 are described in more detail below in conjunction with FIGS. 4-8.

Figure 4:
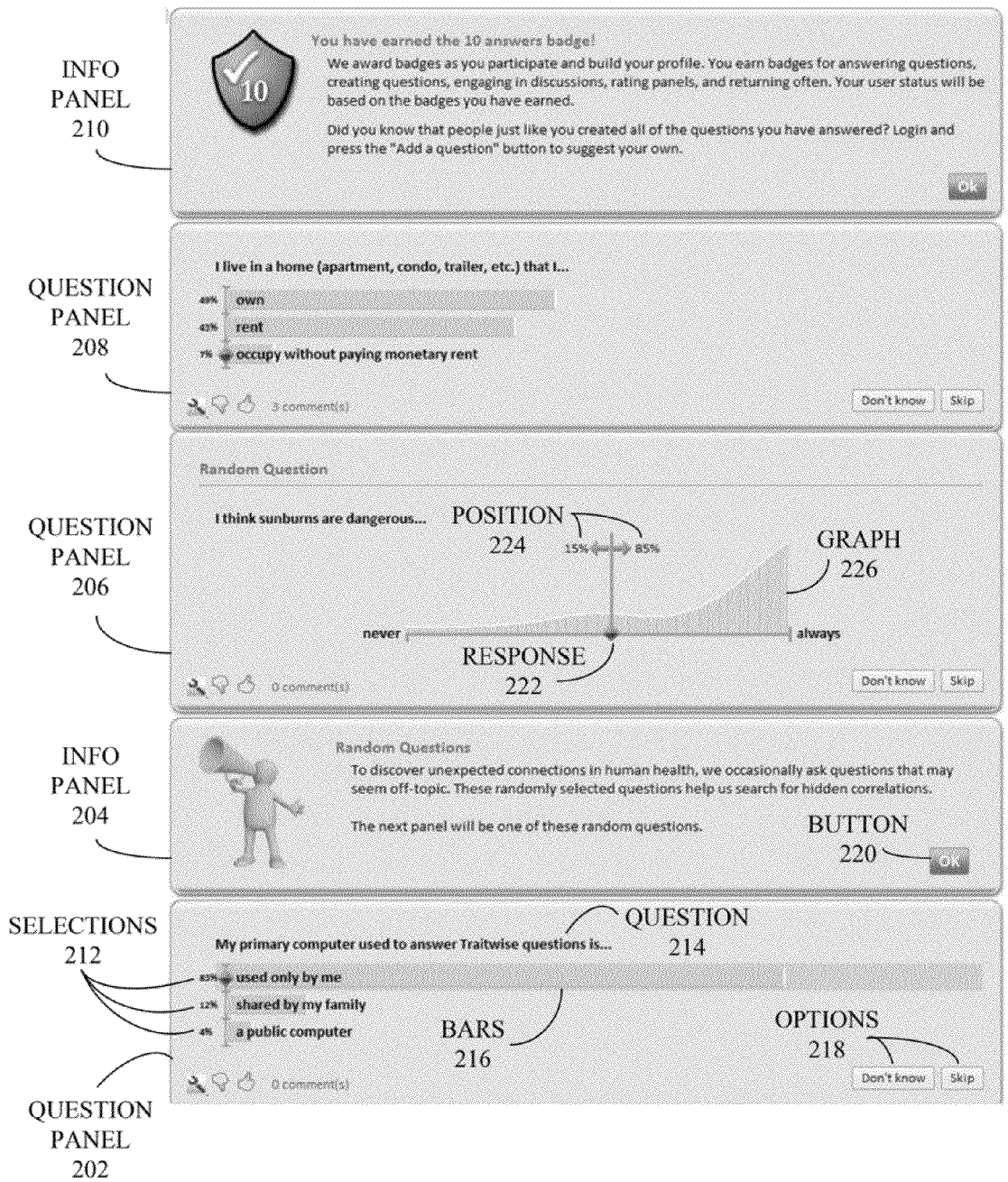
FIG. 4 illustrates examples of various question and information displays, or "panels" used in conjunction with the claimed subject matter.

FIG. 4 illustrates examples of various survey items presented as question and information displays, or "panels" used in conjunction with the claimed subject matter. Specifically, a question panel 202, an information, or "info," panel 204, a question panel 206, a question panel 208 and an info panel 210 are displayed. Panels 202, 204, 206, 208 and 210 are displayed to a client in conjunction with ESAV 158 (FIG. 1) of client system 150 (FIG. 1). In the following example, panels 202, 204, 206, 208 and 210 are displayed in browser 154 (FIG. 1) in the order that they are numbered. In other words, panel 202 is displayed first and, once the client has completed panel 202, panel 202 slides down and panel 204 is displayed. Once panel 204 is completed, panels 202 and 204 slide down and panel 206 is displayed and so on. In this manner, a client taking the survey, or "respondent," is able to view the current question as well as all previous questions and corresponding answers by scrolling down within browser 154.

Question panel 202 is an example of a multiple choice type of question panel. A client is asked to select one of three choices, or "selections," i.e. "used only by me," "shared by my family" and "a public computer," which are selections for a question 214, i.e. "My primary computer used to answer Traitwise questions is . . . " Question panel 202 is an example of a question that has already been answered by the user. To the left of questions 212, result information is superimposed, specifically in this example, "83%," "12%" and "45," which indicated the percent of previous users who answered the question that selected the corresponding answer. Result information such as percentages and indications of correct or incorrect responses may be displayed immediately once the client has responded to the question. Although not illustrated, result information may also display correlations to previously responses and questions. This percent is also displayed graphically by superimposing corresponding bars 216 in a bar graph format. In this example, the client selected "used only by me" as indicated by a diamond on the left edge of the corresponding selection 212. The client is also presented with options 218, i.e. "Don't know" and "Skip," which enable the client to indicate a lack of a selection or proceeds immediately to the next panel, respectively.

Info panel 204 provides information concerning the survey, which in this example is information about the nature of an upcoming question 206. Info panels may also be employed to provide topical information such as, but not limited to, historical, factual and scientific information related to a particular question. Info panel 204 also includes an "OK" button 220 that enables the client to proceed to the next panel by position a pointer (not shown) over button 220 and clicking on a mouse.

Question panel 206 is the result of a client's opinion on a statement, i.e. "I think sunburns are dangerous . . . " in which the client selects a point in a continuum between, in the example, "never" and "always." It should be noted that one aspect of the disclosed technology enables clients, customers and administrators to define questions, including, but not limited to, the specific question or statement, the format or the question or statement, potential answers and the end points of any potential continuum. Superimposed on question panel 206 are a client's response 222, a position 224 corresponding to response 222, i.e. 15% of clients select a point to the left of the current response and 85% select a position to the right, and a distribution graph 226 corresponding to previous responses.

Question panel 208 illustrates another selection panel like question panel 208. Info, or "Badge," panel 210 provides clients with information, which in this case is the fact that the client has been awarded a "badge" for answering ten (10) questions. Such an "Award" or "Badge" panel provides incentives for clients to answer particular questions and take and complete a survey. Such incentives may also include, but are not limited to, coupons or discounts for products or services provided by the corresponding customer.

Figure 5:
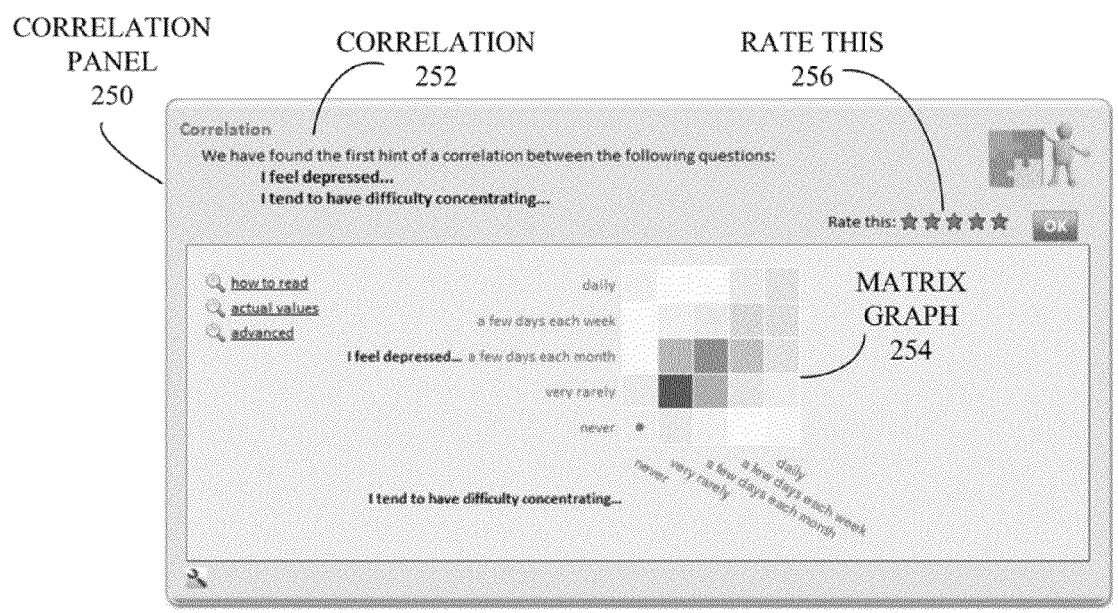
FIG. 5 illustrates a "Correlation panel" used in conjunction with the claimed subject matter.

FIG. 5 illustrates a "correlation panel" 250 used in conjunction with the claimed subject matter. Panel 250 may be displayed to a client in conjunction with ESAV 158 (FIG. 1) of client system 150 (FIG. 1), to a customer in conjunction with ESAC 138 (FIGS. 1 and 3) on server system 122 (FIG. 1) or to an administrator in conjunction with ESAS 118 (FIGS. 1 and 2). In the alternative, panel 250 may be designated only for display to customers in conjunction with ESAC 138 and/or administrators in conjunction with ESAS 118 on Traitwise 102.

Correlation panel 250 includes the correlation 252 that has been discovered, i.e. "We have the first hint of a correlation between the following questions: I feel depressed . . . I tend to have difficulty concentrating . . . " Such a correlation is typically generated by correlation module 164 (FIG. 1) and analytics module 168 (FIG. 1) of ESAS 118 (FIGS. 1 and 2). Correlation 252 is displayed graphically as a matrix, or cluster, graph 254, in which a darker shade indicates a stronger correlation. In this example, the darkest shade corresponds to a response of "very rarely" to both questions "I feel depressed" and "I have difficulty concentrating."

Correlation panel 250 also includes a "Rate This" 256 that enable the viewer of panel 250 to indicate an agreement or approval for the corresponding correlation panel 250. Although not illustrated, a Rate This feature may also be included in question and information panels. Feedback from Rate This features may be employed to identify and discard ambiguous or faulty questions. In addition to a Rate This feature, panels may provide a "Discussion" feature (not shown), which enable a client to provide feedback on questions and information. Such a discussion feature may be employed to identify good and bad questions, encourage new questions and provide a mechanism for different clients to potentially interact with each other, customers and administrators. In addition to a Rate This feature, panels, including question, info and correlation panels may provide access to a "My Profile" tab (not shown) that provides a client to, among other things, customize responses, feedback and displays.

Figure 6:
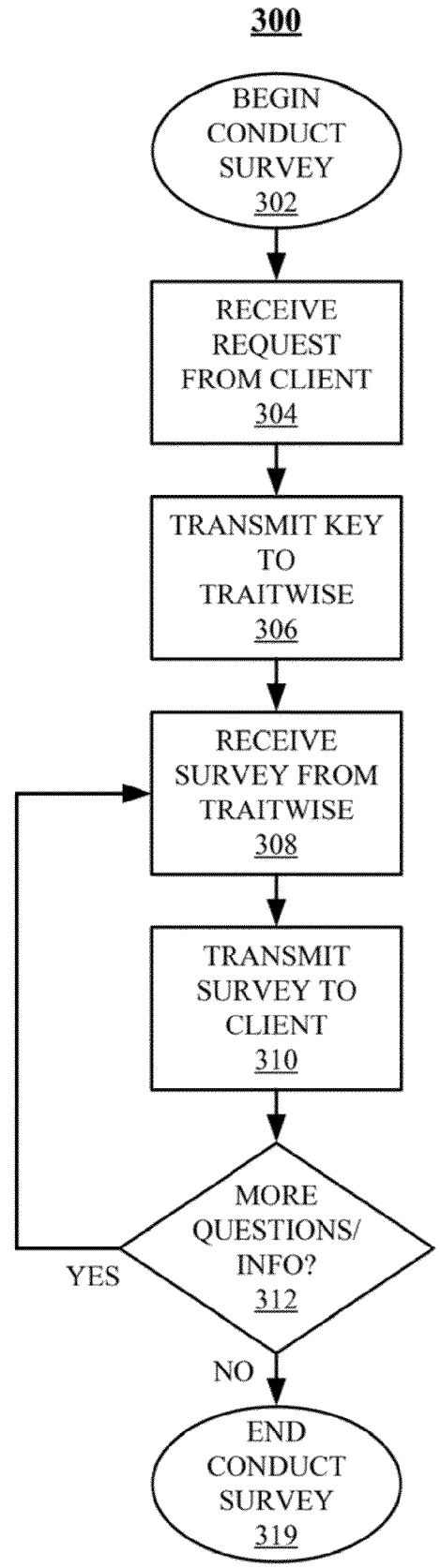
FIG. 6 is a flowchart of a Conduct Survey process that may implement aspects of the claimed subject matter.

FIG. 6 is a flowchart of a Conduct Survey process 300 that may implement aspects of the claimed subject matter. In this example, process 300 is associated with logic stored on CRSM 132 (FIG. 1) in conjunction with ESAC 1.38 (FIGS. 1 and 3) and executed on one or more processors (not shown) of CPU 124 (FIG. 1) of server system 122 (FIG. 1).

Process 300 starts in a "Begin Conduct Survey" block 302 and proceeds immediately to a "Receive Request From Client" block 304. During processing associated with block 304, ESAC 138 receives a request from a client on client system 150. Such a request may be the result of a particular client "clicking" on a link in browser-displayed content such as, but not limited to, a website (not shown) or a blog (not shown). During processing associated with a "Transmit Key to Traitwise" block 306, ESAC 138 associates an identification key to the client who was the source of the request received during processing associated with block 304. Typically, an identification key is assigned to the particular client in conjunction with the client's first request and then stored in client data 194 (FIG. 3) for use in subsequent requests.

During processing associated with a "Receive Survey from Traitwise" block 308, ESAS 118, which generates a survey corresponding to the particular client and customer (see 350, FIG. 7), transmits the survey to ESAC 138. In this manner, the survey, which is received by ESAC 138, may be "embedded" by ESAC 138 into whatever content or electronic communication, e.g. website or blog, the customer is providing to the client on client system 150. During processing associated with a "Transmit Survey to Client" block 310, the survey, which is received during processing associated with block 308 is transmitted, by embedding the survey in the requested content, to the client who initiated the request during processing associated with block 304.

At this point, the client who received the survey would begin responding to the questions and statements. These responses, in conjunction with the identification key, are transmitted to ESAS 118 on Traitwise 102, either via ESAC 128 on server system 122 or directly to ESAS 118 to avoid cross-domain issues. ESAS 118 gathers, correlates and stores the answers (see 354, 356 and 358, FIG. 7). During processing associated with a "More Questions/Info?" block 312, a determination is made as to whether or not the survey is complete. Such a determination may be made in response to a signal from either ESAS 118 or ESAV 158 indicating completion or the expiration of a timer (not shown). An indication of more questions typically is the result of receiving more question/answers/info/correlation panels from ESAS 118. In that case, control returns to block 308 and processing continues as described above. If a determination is made that the survey is complete, control proceeds to an "End Setup Survey" block 319 during which process 300 is complete.

Figure 7:
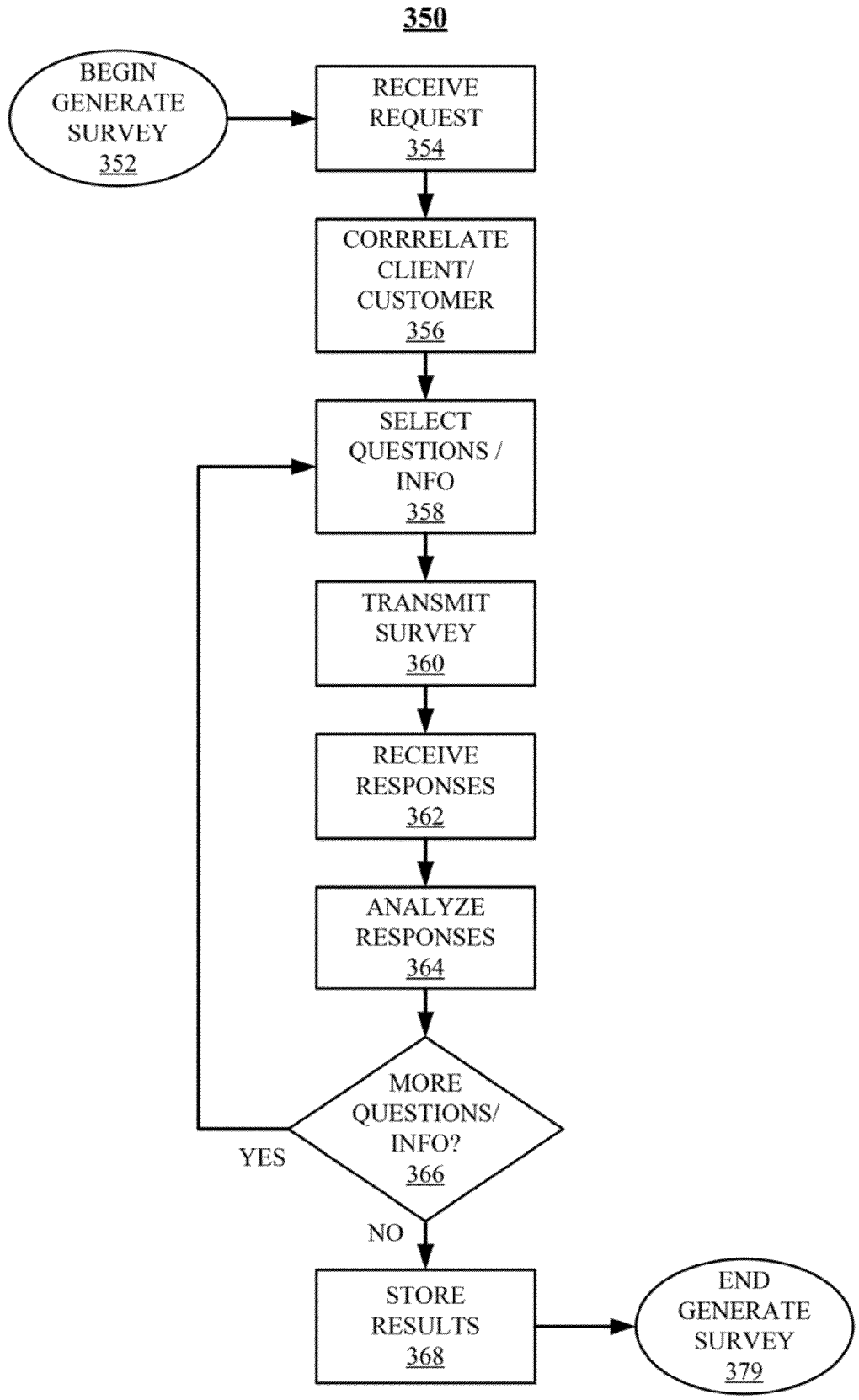
FIG. 7 is a flowchart of a Generate Survey process that may implement aspects of the claimed subject matter.

FIG. 7 is a flowchart of a Generate Survey process 350 that may implement aspects of the claimed subject matter. In this example, logic associated with process 350 is stored on CRSM 112 (FIG. 1) in conjunction with ESAS 118 (FIGS. 1 and 2) and executed on one or more processors (not shown) of CPU 104 (FIG. 1) of Traitwise 102 (FIG. 1).

Process 350 starts in a "Begin Generate Survey" block 352 and proceeds immediately to a "Receive Request" block 354. During processing associated with block 354, a request for a survey, i.e. a collection of survey items for display as questions, answers, info and bonus panels, etc., is received from a customer in conjunction with a client identification (ID) key (see 306, FIG. 6). During processing associated with a "Correlate Client/Customer" block 356, the client ID key associated with the received request and the customer from which the request originated are correlated to each other and to a content library (not shown) at Traitwise 102 or linked to publically available databases. During processing associated with a "Select Questions/Info" block 358, questions, corresponding answers and information related to the client and customer are selected. A particular customer in a particular field of endeavor may have defined specific questions with defined subsets of those questions tailored to particular clients. For example, a customer involved in health care may have a particular client that has been treated for a cold or the flu. Content can then be selected with that information in mind.

Once questions, answers and information have been collected, the assembled content is transmitted to ESAC 138 during processing associated with block a "Transmit Survey" block 360 (see 308, FIG. 6). During processing associated with a "Receive Responses" block 362, results from a client corresponding to the survey transmitted during processing associated with block 360 are received. As explained above in conjunction with FIG. 6, results may be transmitted directly from the client to Traitwise 102 or be transmitted from the client via ESAC 138.

During processing associated with an "Analyze Responses" block 364, question/answer pairs are correlated to previously gathered answer/questions, both form the particular client and from other clients that have answered similar questions. In line with techniques that should be familiar to one with skill in the appropriate arts, similar questions may be asked of the same client, either during one or multiple surveys, to establish whether or not the client is answering consistently. Contradictory answers on two similar questions can indicate that either the client is not being truthful or simply doesn't have an answer. Such responses can then be weighted appropriately in the subsequent analysis.

During processing associated with a "More Questions/Info?" block 366, a determination is made as to whether or not there needs to be a follow up to the survey transmitted during processing associated with block 360. For example, particular answers may reveal the need for a more detailed set of questions; or requirements defined in conjunction with a particular question may specify that a particular follow up question is necessary in response to a particular answer. If a determination is made that more content should be delivered, control returns to block 358 and processing continues as described above.

If, during processing associated with block 366, a determination is made that more questions/info are not needed, control proceeds to a "Store Results" block 368. During processing associated with block 368, the information gathered from the responses received during processing associated with block 362 are stored in DB 116 (FIG. 1) to be employed in the generation and analysis of future surveys and for the providing of results to customers. Finally, control proceeds to an "End Generate Survey" block 379 during which process 350 is complete.

Figure 8:
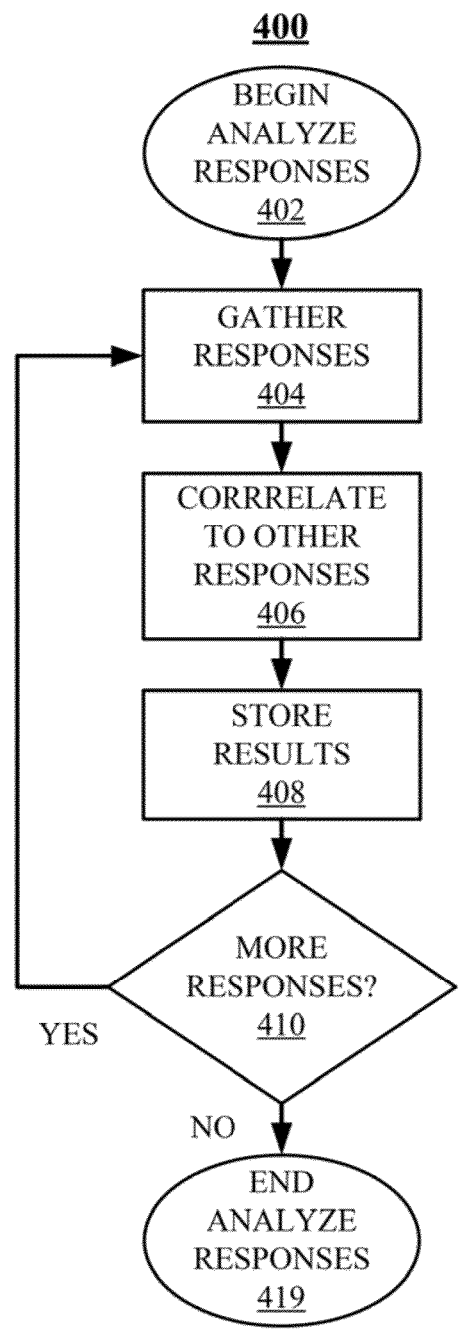
FIG. 8 is a flowchart of an Analyze Responses process that may implement aspects of the claimed subject matter.

FIG. 8 is a flowchart of an "Analyze Responses" process 400 that may implement aspects of the claimed subject matter. Process 400 corresponds to Analyze Responses block 364 of FIG. 7 although the process may also be employed in other capacities such as, but not limited to, off-line processing of results from multiple clients and customer. Like process 350, logic associated with process 400 is stored on CRSM 112 (FIG. 1) in conjunction with ESAS 118 (FIGS. 1 and 2) and executed on one or more processors (not shown) of CPU 104 (FIG. 1) of Traitwise 102 (FIG. 1).

Process 400 starts in a "Begin Analyze Responses" block 402 and proceeds immediately to a "Gather Responses" block 404. During processing associated with block 404, ESAS 118 periodically collects questions from clients, either directly or via ESAC 138 (FIGS. 1 and 3). In the alternative, responses may be collected as they are generated. During processing associated with a "Correlate to Other Responses" block 406, the responses gathered during processing associated with block 404 are correlated (see 164, FIG. 2) to previously received responses both from the current client and from other clients that have been asked the same question. For example, response correlated from the same client may be employed to check consistency and responses correlated from multiple clients may be employed to generate statistics (see 216 and 224, FIG. 4; 254, FIG. 5). During processing associated with a "Store Results" block 408, the information collected during processing associated with block 406 is stored in DB 116 for future analysis and to report results to customers.

During processing associated with block "More Responses?" block 410, a determination is made as to whether or not all the responses corresponding to a particular survey have been collected. If not, control returns to block 404 and processing continues as described above. If no more responses are expected, control proceeds to an "End Analyze Responses" block 419 during which process 400 is complete.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method, comprising;
receiving, by an embedded survey and analytics server (ESAS), a request for a survey, the survey comprising a plurality of survey items, each survey item comprising one of a survey item type, the survey item types comprising information survey items and question survey items;

correlating the request for the survey with a particular client and a particular customer;
generating the survey by selecting a first selection of survey items corresponding to the particular client and the particular customer;
transmitting the survey to an embedded survey and analytics client (ESAC) on a server computing device associated with the particular customer;
embedding, by the ESAC, the survey into an electronic communication;
transmitting the electronic communication to the client;
receiving, at the ESAS, a plurality of responses, each response corresponding to a specific survey item of the first selection of survey items;
analyzing, by the ESAS, the plurality of responses to produce survey results;
transmitting the survey results to the customer;
receiving at the ESAS, from the client, a suggested survey item; and
incorporating the suggested survey item into a second selection of survey items corresponding to a second survey.

2. The method of claim wherein the electronic communication is a web page, associated with the particular customer.

3. The method of claim 1, wherein the electronic communication is Hog, associated with the particular customer.

4. The method of claim 1, the survey item types further comprising bonus survey items.

5. The method of claim 1, further comprising transmitting feedback corresponding to a particular response to the client such that the feedback is superimposed on a display to the client associated with the specific survey item corresponding to the particular response.

6. The method of claim 1, wherein the selecting the first selection of survey items maximizes coverage with respect to available survey items.

7. An apparatus, comprising:
a processor;
a non-transitory computer readable storage medium (CRSM) coupled to the processor;
an embedded survey and analytics server (ESAS); and
logic, stored on the CRSM and executed by a processor, for;
  receiving, by the ESAS, a request for a survey, the survey comprising a plurality of survey items, each survey item comprising one of a survey item type, the survey item types comprising information survey items and question survey items;
  correlating the request for the survey with a particular client and a particular customer;
  generating the survey by selecting a first selection of survey items corresponding to the particular client and the particular customer;
  transmitting the survey to an embedded survey and analytics client (ESAC) on a server computing device associated with the particular customer;
  embedding, by the ESAC, the survey into an electronic communication;
  transmitting the electronic communication to the client;
  receiving, at the ESAS, a plurality of responses, each response corresponding to a specific survey item of the first selection of survey items;
  analyzing, by the ESAS, the plurality of responses to produce survey results;
  transmitting the survey results to the customer;
  receiving at the ESAS, from the client, a suggested survey item;
  and
  incorporating the suggested survey item into a second selection of survey items corresponding to a second survey.

8. The apparatus of claim 7, wherein the electronic communication is a web page, associated with the particular customer.

9. The apparatus of claim 7, wherein the electronic communication is blog, associated with the particular customer.

10. The apparatus of claim 7, the survey item types further comprising bonus survey items.

11. The apparatus of claim 7, the logic further comprising logic for transmitting feedback corresponding to a particular response to t he client such that the feedback is superimposed on a display to the client associated wit h the specific survey item corresponding to the particular response.

12. The apparatus of claim 7, wherein the logic for selecting the first selection of survey items maximizes coverage with respect to available survey items.

13. A computer programming product, comprising;
a non-transitory computer readable storage medium (CRSM); and
logic, coupled to the CRSM for execution on a processor, for;
  receiving, by an embedded survey and analytics server (ESAS), a request for a survey, the survey comprising a plurality of survey items, each survey item comprising one of a survey item type, the survey item types comprising information survey items and question survey items;
  correlating the request for the survey with a particular client and a particular customer;
  generating the survey by selecting a first selection of survey items corresponding to the particular client and t he particular customer ;
  transmitting the survey to an embedded survey and analytics client (ESAC) on a server computing device associated with the particular customer;
  embedding, by the ESAC, the survey into an electronic communication;
  transmitting the electronic communication to the client;
  receiving, at the ESAS, a plurality o f responses, each response corresponding to a specific survey item of the first selection of survey items;
  analyzing, by the ESAS, the plurality of responses to produce survey results;
  transmitting the survey results to the customer;
  receiving at the ESAS, from the client, a suggested survey item;
  and
  incorporating the suggested survey item into a second selection of survey items corresponding to a second survey.

14. The computer programming product of claim 13, wherein the electronic communication is a web page, associated with the particular customer.

15. The computer programming product of claim 13, wherein the electronic communication is bog. associated with the particular customer.

16. The computer programming product of claim 13, the survey item types further comprising bonus survey items.

17. The computer programming product of claim 13, the logic further comprising, logic for transmitting feedback correspond in g to a particular response to the client such that the feedback is superimposed on a display to the client associated with the specific survey item corresponding to the particular response.

\* \* \* \* \*